June 24, 1952 C. A. BUSHEY 2,601,588
AIR HAMMER SAFETY VALVE
Filed Sept. 26, 1947 2 SHEETS—SHEET 1
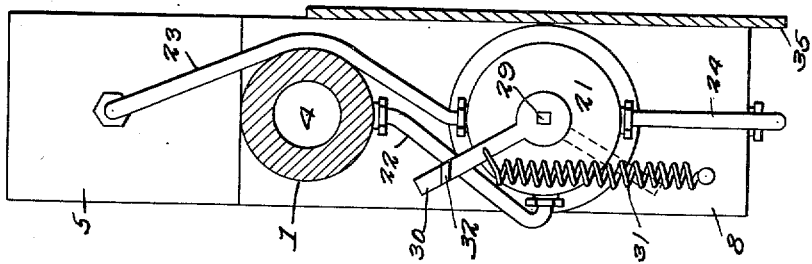
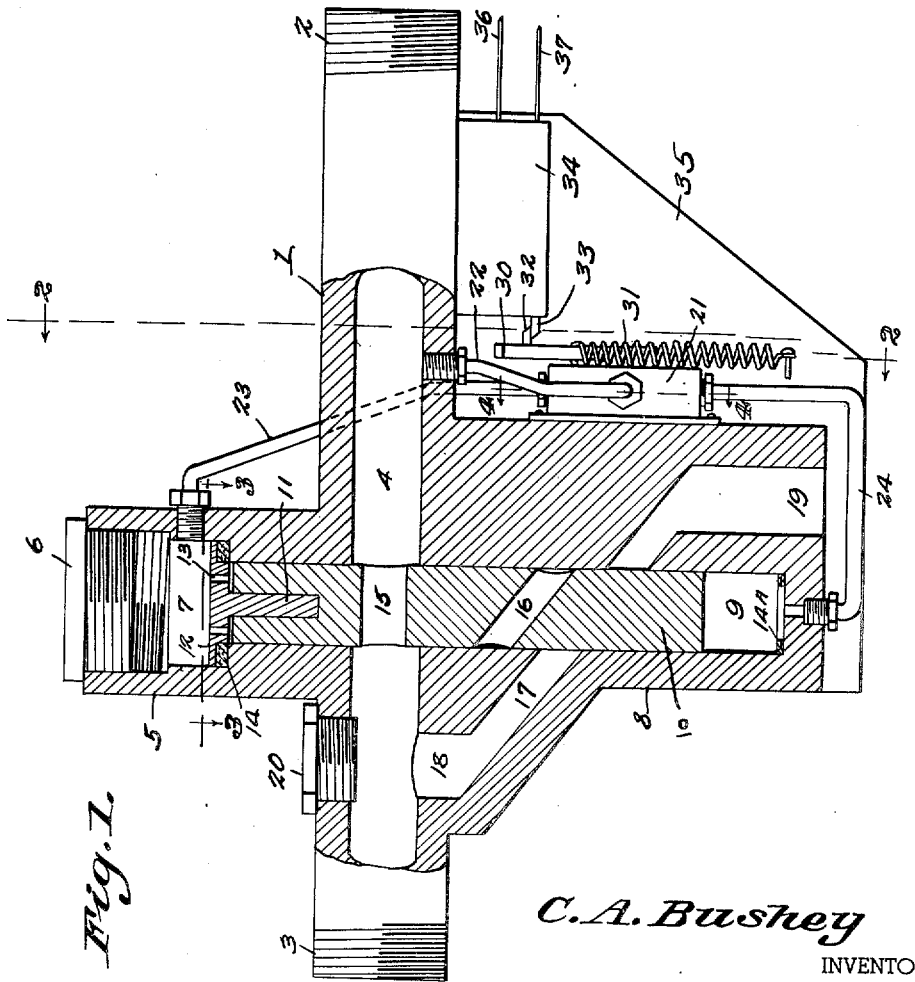
C. A. Bushey
INVENTOR
BY C A Knowles
ATTORNEYS.

June 24, 1952 — C. A. BUSHEY — 2,601,588
AIR HAMMER SAFETY VALVE
Filed Sept. 26, 1947 — 2 SHEETS—SHEET 2
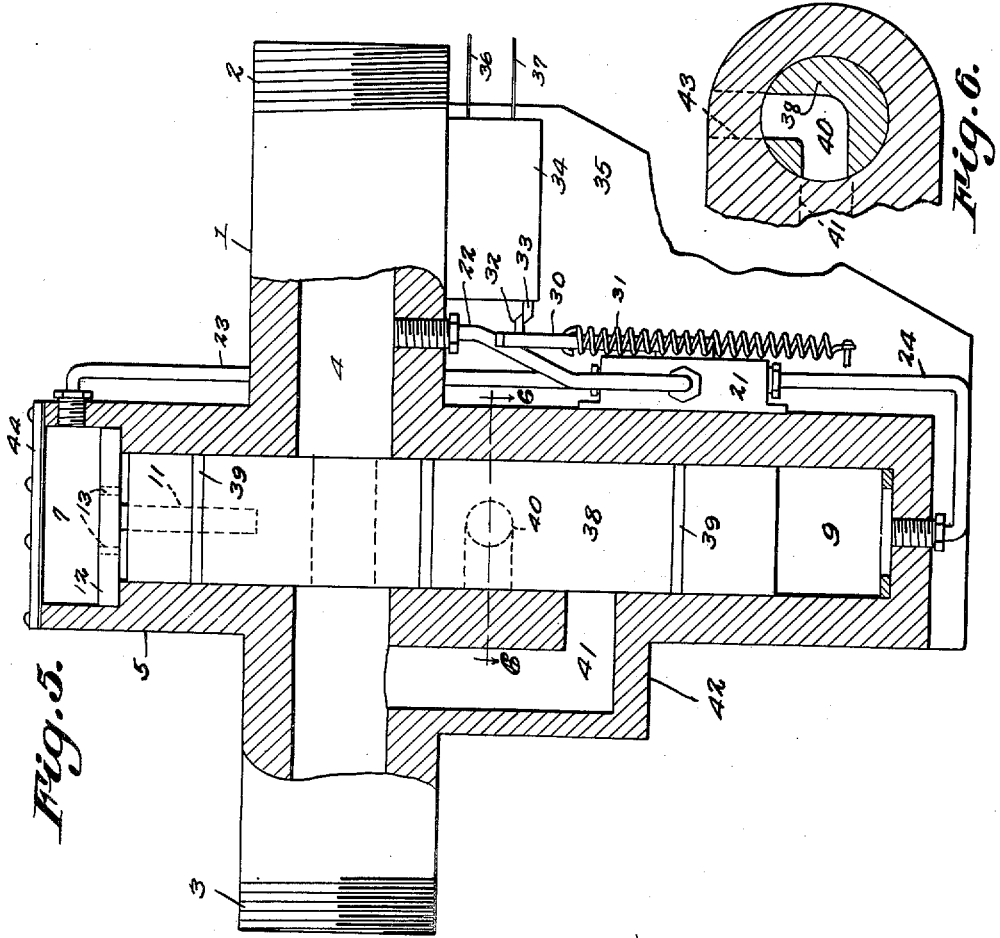
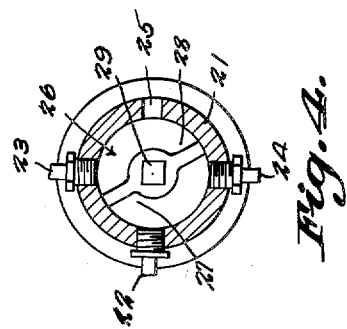
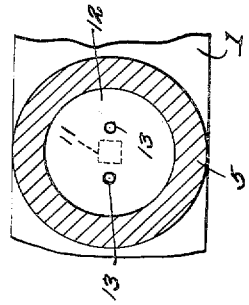
C. A. Bushey
INVENTOR
BY Snow & Co.
ATTORNEYS.

Patented June 24, 1952

2,601,588

UNITED STATES PATENT OFFICE 2,601,588

AIR HAMMER SAFETY VALVE

Clay A. Bushey, Los Angeles, Calif.

Application September 26, 1947, Serial No. 776,378

1 Claim. (Cl. 137—658)

My present invention relates generally to pneumatic or fluid pressure operated tools and more specifically to an air hammer safety valve that is electrically controlled and activated by fluid pressure for installation in power hammers, drills, and other impact tools of the pneumatically operated type.

While the safety valve of my invention is adapted for incorporation as a component part of various tools of this character, it is especially designed for use in a pneumatic impact drill while employed in drilling concrete and similar walls that may contain metallic parts not intended for operations of the drill bit. Under such conditions when a metal object or body is contacted by the bit a normally open electric control circuit is closed thereby energizing a solenoid in the circuit which releases a spring-operated control valve, and the control valve, which is preferably of the rotary type, supplies fluid pressure to a reciprocable piston-valve that cuts off the supply of fluid pressure for operating the pneumatic tool; and manually operated means are provided for automatically re-setting the reciprocable safety valve.

The safety appliance of my invention includes a minimum number of parts that may with facility be manufactured at low cost of production, and the parts may be assembled with convenience to constitute a unitary structure that may readily be installed for use in various pneumatic tools; and the invention consists in certain novel features of construction and combinations and arrangements of parts as will hereinafter be described and more particularly set forth in the appended claim.

In the accompanying drawings I have illustrated a complete example of a physical embodiment of my invention wherein the parts are combined and arranged in accord with one mode I have devised for the practical application of the principles of the invention. It will however be understood that various changes and alterations are contemplated and may be made, as is evidenced by the modification illustrated, in these exemplifying drawings and mechanical and electrical structures, within the scope of my claim, without departing from the principles of the invention.

Figure 1 is a vertical sectional view and partial elevation of the safety unit in which my invention is embodied, and adapted for installation in a pneumatic tool.

Figure 2 is an end view of the structure of Fig. 1 with parts in section on line 2—2 of Fig. 1.

Figure 3 is a transverse sectional view through the compression chamber of the valve casing at line 3—3 of Fig. 1.

Figure 4 is a vertical sectional view showing the three-way rotary control valve, as at line 4—4 of Fig. 1.

Figure 5 is a partial section and part side elevation of a modified form of the invention; and Figure 6 is a detail sectional view at line 6—6 of Fig. 5 through an exhaust port of the safety valve or reciprocable piston valve and casing.

In carrying out my invention the pneumatic tool is equipped with the safety unit by interposing the unit in the air supply to the impact tool, and in the form illustrated in Fig. 1 the unit includes a casting or housing having a cylindrical bushing 1 that is threaded at its ends 2 and 3 for insertion in the air supply line at a convenient point of the tool, and the bushing forms an air chamber through which the air under pressure flows from right to left in Fig. 1.

The casting or housing also includes a transversely arranged integral valve casing, one end of which is formed by the upper bushing 5, the open end of which is closed by a screw plug 6, and a compression chamber 7 is thereby formed at the end of the valve casing.

A lower extension 8 of the casting or housing, together with the bushing 5 forms a transversely arranged valve casing having a cylindrical bore that intercepts the chamber 4 of the pipe line 1, and the lower end of the closed extension forms an exhaust chamber 9.

A solid cylindrical safety or piston valve 10 of the fluid pressure operated type is reciprocably mounted in the bore of the valve casing, and this piston-valve is provided with a fixed stem 11, angular or square in cross section that fits in an open end socket of the piston valve, to prevent rotary displacement of the valve and guide the reciprocating movement of the valve.

The stem is provided with an integral circular head 12 fixed within the bushing 5, and ports 13 in the flat head provide communication for air under pressure between the valve casing and the compression chamber, gaskets 14 being provided for sealing the joint between the head and the bushing.

At the opposite end of the valve casing a gasket or washer 14A is provided within the exhaust chamber 9 to perform the functions of a cushion in absorbing shocks from the opening movement of the safety valve.

The reciprocating piston valve is provided with a main transversely arranged port 15 which is normally alined with and open to the air-flow chamber 4; and a spaced diagonally arranged exhaust port 16 is also provided in the valve and normally closed by the wall of the valve casing.

By longitudinal movement of the piston valve under air pressure in the compression chamber 7 the piston valve is moved, as a safety measure, to bring the exhaust port into alinement with exhaust ducts 18 and 19 of the housing, duct 18 being open to the chamber 4 and duct 19 opening to the atmosphere; and a screw plug 20 is threaded in an opening in the housing wall or air pipe 1, opposite to the port 18 for access to the interior of the housing and its parts.

The safety valve is moved from its normally open position in Fig. 1 to closed position, for cutting off the fluid pressure of the impact tool, under fluid pressure that is controlled by a three-way rotary valve, and this normally closed, rotary, control valve is released by electro magnetic means, and then moved to open position by automatic means, as for instance a spring. For resetting the control valve and the safety valve, the former may be manually operated, and then the safety valve is restored to normal open position under air pressure through the open control valve.

For this purpose a cylindrical valve casing 21 is mounted on the exterior of the housing and provided with an air supply pipe 22 open to chamber 4; an air compression pipe 23 that opens to the compression chamber 7; an exhaust pipe 24 that communicates with the exhaust chamber 9; and an outlet port 25 open to the atmosphere.

A rotary air valve 26 having ports 27, 28, for registration or alinement with the three-way ports of these pipes, is mounted in the valve casing 21, and this rotary control valve is provided with a central radial stem 29 upon the exterior end of which an operating arm or crank arm 30 is mounted, and a spring 31 attached to the arm and anchored to the housing tends to swing the three-way valve to open position.

The arm 30 with the rotary valve is retained in normally closed position against tension of the spring, and the arm is provided with a lug 32 that frictionally engages a detent 33 rigid with a solenoid mounted in a suitable box 34 that may be attached to a plate 35 of the housing. Electric wires 36 and 37 are indicated as leading to the solenoid, and these wires form part of an electric safety circuit that is closed if and when the drill bit contacts with a metallic body, and the circuit which is grounded through the metal of the tool, also includes necessary electrical appliances, not shown, but utilized for withdrawing the detent 33 from the lug 32.

When the solenoid releases the lug, the spring swings the rotary valve to open position, for exhausting air pressure from chamber 4 and applying air pressure through chamber 7 against the top of the piston valve, and simultaneously exhausting air pressure from chamber 9.

Under these conditions, fluid pressure in chamber 7 forces the piston valve to closed position cutting off the air supply to the pneumatic tool through chamber 4, and the tool is rendered powerless, but with an air supply in the chamber 4 to the right of the closed safety valve.

For re-setting the safety valve, the rotary control valve is first manually reset with the lug or pawl 32 in contact with detent or solenoid 33, and the control valve is now in position to receive fluid pressure from the chamber 4 through pipe 22. Under these conditions air under pressure is conveyed through pipe 24 to the chamber 9, and air is exhausted from chamber 7 through pipe 23 and the valve casing to the atmosphere, thereby permitting air pressure in chamber 9 to lift the piston valve to position of Fig. 1, for continued operation of the tool.

In the slightly modified form of the invention shown in Figs. 5 and 6, the piston valve 38 is equipped with spaced rings 39, and an angular exhaust port 40 that is adapted to register with an angular duct 41 in the extension 42 and also with a port 43 in the extension; and the open end of the bushing 5 is closed by a plate 44 bolted thereto.

Having thus fully described my invention, what I claim as new and desire to secure by Letters Patent is:

A safety valve for work tools, comprising a housing having a bushing adapted to be connected with the air supply line of a tool, through which compressed air passes to such a tool, a transversely arranged valve casing having an upper compression chamber and a lower exhaust chamber, said exhaust chamber having registering exhaust ducts, one of said ducts connecting with the air supply line, the other exhaust duct communicating with the atmosphere, a reciprocable safety valve operated within the casing, said valve having a port normally open to the air supply line, said valve also normally closing said exhaust ducts, a head on one end of the safety valve operating in said compression chamber, a cylindrical valve casing mounted on the housing, having an outlet port open to the atmosphere, a rotary control valve in said cylindrical valve casing, an operating arm and lug on said rotary control valve, a pipe establishing communication between the exhaust chamber and cylindrical valve casing, a pipe establishing communication between the cylindrical valve casing and compression chamber, an air supply pipe establishing communication between said bushing and said cylindrical valve casing through which air normally passes to said exhaust chamber, means for retaining the control valve in its normal position including an open electric circuit and a solenoid in said circuit, a spring biasing said control valve away from its normal position, said solenoid cooperating with said lug whereby the control valve is released when said circuit is closed and is moved under its bias to a position in which communication is established between the air supply pipe and the upper compression chamber and between the exhaust chamber and the atmosphere, said safety valve thereby closing said port normally to the air supply line and opening said exhaust ducts.

CLAY A. BUSHEY.

REFERENCES CITED

The following references are of record in the file of this patent:

UNITED STATES PATENTS

| Number | Name | Date |
|---|---|---|
| Re. 19,040 | Sanford | Jan. 2, 1934 |
| 533,283 | Engberg | Jan. 29, 1895 |
| 782,778 | Cotton | Feb. 14, 1905 |
| 844,923 | Cridge | Feb. 19, 1907 |